United States Patent [19]

Holzschuh

[11] Patent Number: 5,762,973

[45] Date of Patent: Jun. 9, 1998

[54] HYDRAULIC OPERATING SYSTEM FOR PLASTICS PROCESSING MACHINES, ESPECIALLY FOR INJECTION MOLDING MACHINES

[75] Inventor: Johann Holzschuh, Meinerzhagen, Germany

[73] Assignee: Battenfeld GmbH, Meinerzhagen, Germany

[21] Appl. No.: 664,947

[22] Filed: Jun. 14, 1996

[30] Foreign Application Priority Data

Jul. 4, 1995 [DE] Germany ............ 195 24 395.1

[51] Int. Cl.$^6$ ........................................ B29C 45/77
[52] U.S. Cl. .................. 425/145; 264/40.7; 425/149
[58] Field of Search ..................... 425/146, 145, 425/149; 264/40.7

[56] References Cited

U.S. PATENT DOCUMENTS

| | | | |
|---|---|---|---|
| 3,911,677 | 10/1975 | Collins | 60/368 |
| 4,518,318 | 5/1985 | Jensen et al. | 417/53 |
| 4,573,898 | 3/1986 | Jones et al. | 425/145 |
| 5,018,955 | 5/1991 | Parrish et al. | 425/146 |

FOREIGN PATENT DOCUMENTS

| | | | |
|---|---|---|---|
| 394825B | 6/1992 | Austria. | |
| 399 312 B | 4/1995 | Austria. | |
| 0 403 041 A2 | 6/1990 | European Pat. Off.. | |
| 0 403 041 B1 | 8/1994 | European Pat. Off.. | |
| 1 114 903 | 10/1961 | Germany. | |
| 2 263 797 | 7/1973 | Germany. | |
| 37 33396 A1 | 4/1989 | Germany | F04B 49/06 |
| 43 35 403 C1 | 12/1994 | Germany | B29C 45/76 |
| 43 35 328 A1 | 4/1995 | Germany | B29C 45/82 |
| 55-084642 | 6/1980 | Japan. | |
| 50-84799 | 4/1993 | Japan. | |
| 1 392 404 | 4/1975 | United Kingdom. | |

*Primary Examiner*—Tim Heitbrink
*Attorney, Agent, or Firm*—Hamilton, Brook, Smith & Reynolds, P.C.

[57] ABSTRACT

A hydraulic operating system for plastic processing machines, especially for injection molding machines, comprises a hydraulic pump (1), which is driven by an electric motor (2), at least one hydraulic drive (3, 4, 5), a hydraulic line network (6), which connects the hydraulic pump (1) and the hydraulic drives (3, 4, 5), and a machine control (7), in which the hydraulic pump (1) is designed a continuous or constant transport pump and the electric motor (2) is operated at a variable rpm, being appropriately influenced by the machine control (7). So as to be able to dispense with an expensive pressure regulated valve, and thus to provide an economical injection molding machine, the invention specifies that the machine control (7) prescribes the current hydraulic volume (Q) that is needed according to program to the electric motor (2) as an rpm setpoint (n) and prescribes the current hydraulic pressure (p) that is needed according to program to the electric motor (2) as a torque setpoint (M), in which connection the electric setpoint data for the rpm (n) and the torque (M) and respectively for the hydraulic volume flow (Q) and for the hydraulic pressure (p) are stored in a memory (8), to which the machine control (7) has access.

16 Claims, 1 Drawing Sheet

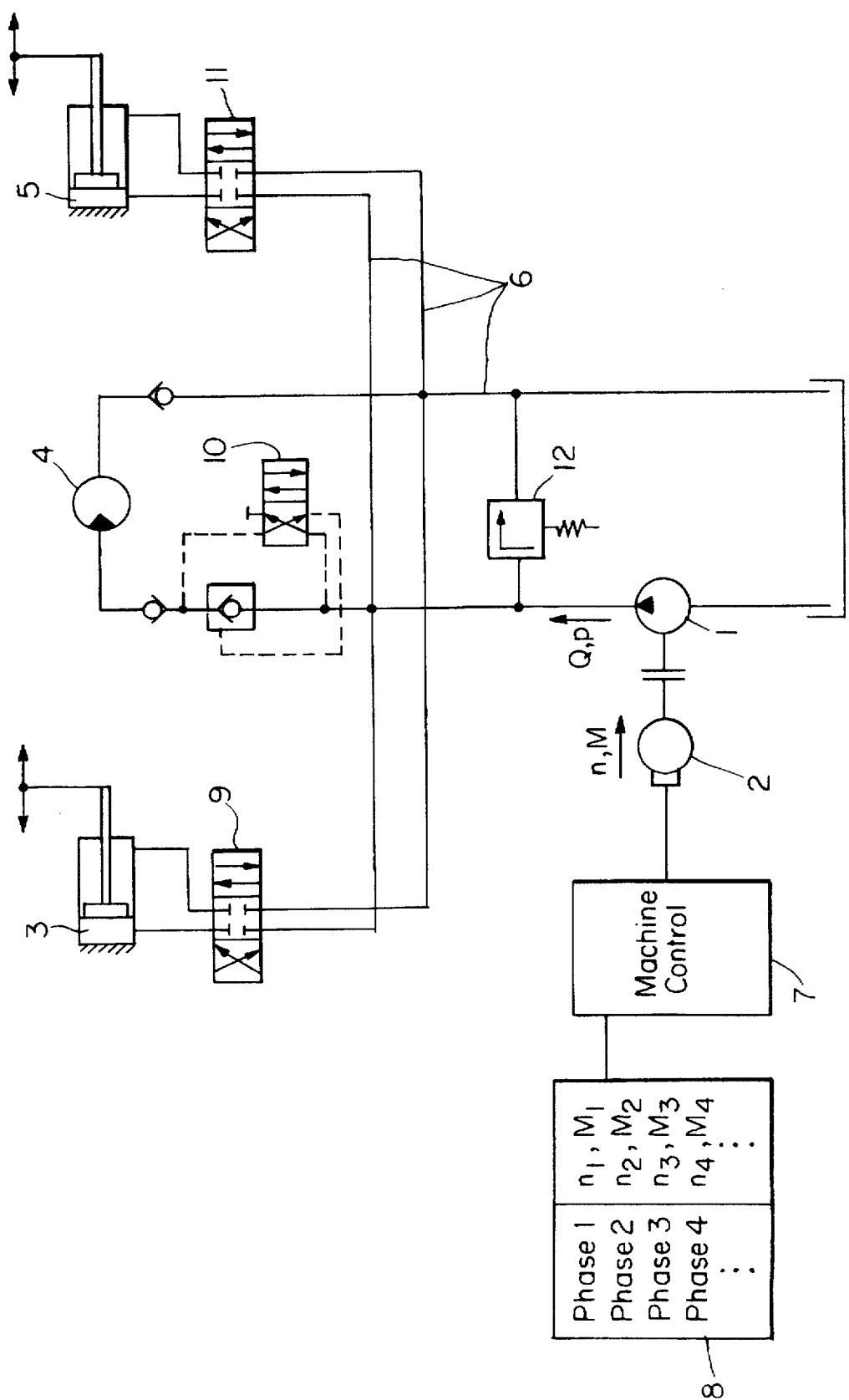

HYDRAULIC OPERATING SYSTEM FOR PLASTICS PROCESSING MACHINES, ESPECIALLY FOR INJECTION MOLDING MACHINES

BACKGROUND OF THE INVENTION

To supply pressurized hydraulic oil to the individual loads, e.g., clamping cylinder, screw drive, injection cylinder, etc., of a hydraulically operated injection molding machine, an operating system is needed to control hydraulic fluid circulation. Such a hydraulic operating system of an injection molding machine is already known from the DE-OS 22 63 797. In order to save as much energy as possible, this reference specifies that the machine have a variable speed electric motor for driving a hydraulic pump. The drive motor is operated so that its power consumption in terms of revolutions per minute (rpm) and torque is always matched to the instantaneous hydraulic power demand. The electric drive motor is thus adapted in such a way that it can be operated at rpm's and at the torques that are always varied directly in accordance with the hydraulic requirements of the injection molding machine during an injection molding cycle.

A further development of such an operating system is known from the DE 43 35 328 A1. This references discloses a hydraulic operating system for an injection molding machine with a plurality of hydraulic drives. By means of a hydraulic line network and valves, these can be connected in arbitrary number and sequence. To make the drive highly efficient, the design is such that the hydro-pump is a continuous or constant transport pump with an adequate transport flow and pressure, and that the pump can be regulated at a variable rpm extending over a prescribed rpm range. Furthermore, the maximum transport flow and pressure can be matched to the maximum quantity and pressure consumed by the hydraulic drives, and the rpm of the electric motor can be regulated in proportion to the quantity and pressure consumed by the hydraulic drives that are in operation at any particular time. This reference further discloses that an electrically actuatable pressure-limiting and pressure-relief valve and/or a proportional pressure-limiting valve is associated with the aforesaid hydraulic continuous or constant transport pump, so as to assure load-pressure regulation.

SUMMARY OF THE INVENTION

The disadvantage of the previously-described design is that the pressure regulation valve represents a significant cost factor in the hydraulic operating system. This increases costs associated with constructing the known operating system.

The present invention is directed to a hydraulic operating system for a plastics processing machine, especially for an injection molding machine in which the advantages known from the prior art are fully realized, but in a more economical design that dispenses with an expensive pressure regulation valve.

In general, the invention features the machine control that both prescribes the current hydraulic volume (Q) that is needed according to program to the electric motor as an rpm setpoint (n) and prescribes the current hydraulic pressure (p) that is needed according to program to the electric motor as a torque setpoint (M). Electric setpoint data for the rpm (n) and the torque (M) and thus respectively for the hydraulic volume flow (Q) and for the hydraulic pressure (p) are stored in a memory to which the machine control has access.

It is therefore assured that the electric motor driving the hydro-pump receives from its control exactly those power commands which on the one hand are indeed sufficient to supply the hydraulic loads adequately, but which on the other hand avoid unnecessary hydro-power production. Consequently, since neither too much nor too little hydro-power is made available, the necessity previously existing in the prior art, to accomplish matching supply and demand by expensive means (pressure regulation valves), possibly with system-based waste of hydro-power, is obviated.

In particular, the first modification of the invention is one in which the respective setpoints (M) are prescribed as torque limits which may not be exceeded. Therefore, the corresponding hydraulic pressure (p) is limited.

In the interaction of the rpm control with the torque limiting mechanism, it is further possible to implement a power control or power limitation. This feature is one wherein the current power (P) is calculated in the machine control from the cyclic setpoint data for the pressure (p) and for the hydraulic volume flow (Q) and/or from the rpm (n) and the torque (M) according to the relationship $$P = p \times Q \text{ and/or } P = n \times M$$

and are used as a basis for regulating the electric motor, the machine control here accessing the data stored in the memory.

According to another modification of the invention, the power (P) that is needed at any particular time is prescribed as a power limit that may not be exceeded, as a consequence of which the power (P) is limited.

Furthermore, the machine control can trigger an alarm if the determination of the power (P) results in a value that exceeds a preset maximum.

Finally, another modification is one wherein the energy (W) consumed over an operating cycle is determined from the calculated power (P) over the time (t) by means of the relation $$W = \int P \, dt$$

and is outputted.

It is thus possible to pre-calculate the power on the basis of the setpoints that have been pre-selected for the injection cycle. If, at any time segment of the cycle, this calculation yields a value of the power that exceeds a maximum value defined by the machine manufacturer, the machine control can report this to the operator in charge of set-up and can suggest an alternative value that will no longer exceed the maximum power.

By means of the calculated values for the power in the individual time phases of a production cycle of the machine and by means of the likewise pre-selected durations or operationally derived durations of the individual phases, it is thus possible to pre-calculate the power consumption of the machine. By changing individual setpoints, it is then possible to find the optimum machine setting and in this manner to minimize the power consumption for the purpose of reducing costs.

By providing the ability to pre-calculate not only the power consumed by the pump drive but also the heat power, one utilizes the numerical value, stored in the machine control, for the installed heat power. The pre-calculation is here based on an empirical value for the average time during which the heater is switched on (e.g. 25%). An exact calculation can be made at a later time, while the injection molding machine is operating, with the precise value of the switch-on duration, that is then available.

An advantageous modification of the invention is one wherein the hydraulic pump is an internally-geared-wheel pump.

The electric motor can be designed as a vector-regulated, three-phase squirrel-cage motor, or as a frequency regulated, three-phase squirrel-cage motor. It can also be a three-phase servo-motor.

In particular, another feature can be one wherein the electric motor is actuated by one or more programmable ramp generators which act on the rpm control and/or on the torque control.

A favorable structural design is one wherein the hydraulic pump is flanged directly on the electric motor or is connected to it through a pump carrier.

A design especially well suited for regulation is one wherein the rpm control and/or the torque control of the electric motor is subject to a setpoint/actual value control, which in turn is again influenced by sensors at the hydraulic drives.

The above and other features of the invention including various novel details of construction and combinations of parts, and other advantages, will now be more particularly described with reference to the accompanying drawings and pointed out in the claims. It will be understood that the particular method and device embodying the invention is shown by way of illustration and not as a limitation of the invention. The principles and features of this invention may be employed in various and numerous embodiments without departing from the scope of the invention.

BRIEF DESCRIPTION OF THE DRAWINGS

The figure schematically shows a hydraulic operating system for an injection molding machine of the present invention.

DESCRIPTION OF THE PREFERRED EMBODIMENTS

The figure illustrates a hydraulic operating system that has been constructed according to the principles of the present invention. The operating system has a hydraulic pump 1, which is connected via a coupling to the electric motor 2. The motor 2 delivers to the pump 1 a defined torque M at an rpm n. The pump 1 suctions hydraulic oil from an oil tank or reservoir and pumps it at a transport rate Q, at a pressure p which depends on the motor's rpm n and torque M.

The pump 1 is connected to a hydraulic line 6. In this way, the hydraulic oil passes from the pump 1, through the line 6, to the clamping piston cylinder system 3 (hydraulic drive). The latter accomplishes the opening and clamping motions of the platens of the injection molding machine. The specific current flow direction and the closure of the line are determined by the directional control valve 9. In its turn, the latter is again activated by the machine control (not shown). In analogous fashion, the screw-drive hydro-motor 4 and the injection piston cylinder system 5 is charged with hydraulic oil, with the directional control valves 10 and 11 having a control function.

The electric drive motor 2 is controlled or regulated by the machine control 7. The latter executes the cycle program for the entire injection molding cycle. The setpoint for the rpm (n) and for the torque (M)—or for the hydraulic volume flow (Q) and the hydraulic pressure (p)—are stored in a memory 8 that is connected to the machine control 7, and specifically for every phase, phase 1, 2, 3, . . ., of the injection molding cycle.

The operating system is thus able, for every instantaneous situation of the injection molding cycle, to read out from the memory 8 the optimum setpoints for the rpm and for the torque of the motor 2 and/or for the volume flow and the pressure of the pump 1. These data can be processed in the machine control center so that the motor and the pump are operated at exactly the power that is needed for an optimal process. No excess hydro-power is thus generated, which then would only have to be dissipated via a pressure regulation valve, as is the case with the prior art.

On the contrary, for safety reasons, only a simple and economical pressure limiting valve 12 is provided, through which the hydraulic oil can flow off into the oil tank if the pressure in the line network 6 is impermissibly high.

To regulate the hydraulic pressure, the inventive hydraulic operating system uses the regulation of the torque of the pump drive motor 2. The pressure regulation in the system operates by the principle of pressure limitation. A torque limit is associated with each hydraulic pressure (e.g. in steps of one bar) for each possible motor rpm (e.g. in percentage steps). The electrical control data for torque limitation are permanently stored in the machine control 7 and/or the memory 8. Torque limitation can be selected or canceled at will. As already said, only the spring-loaded pressure limiting valve 12 is provided to secure the maximum pressure in the operating system.

The operating system is suited for all hydraulic machines, e.g. for injection molding machines, injection presses, presses, etc., whose individual motions occur sequentially one after another.

For motions that take place completely or at least partly simultaneously, an oil flow divider (not shown) is used to implement e.g. two independent motions of the hydraulic drives 3, 4, 5. A fixed division ratio corresponds to the ratio of the individual flows of the two loads. A flow divider of this type is an extremely low-maintenance and low-cost hydraulic construction element.

In the event that the division ratio should be variable, a quantity control is disposed in one of the two load lines in place of a flow divider. The quantity control can be adjusted either manually or electrically.

While this invention has been particularly shown and described with references to preferred embodiments thereof, it will be understood by those skilled in the art that various changes in form and detail may be made therein without departing from the spirit and scope of the invention as defined by the appended claims.

What is claimed is:

1. A hydraulic operating system for a plastic processing machine, comprising a hydraulic pump which is a continuous or constant transport pump;

at least one hydraulic drive;

a hydraulic line network which connects the hydraulic pump and the at least one hydraulic drive;

a machine control; and an electric motor which drives the hydraulic pump at a variable rpm under the control of the machine control;

wherein the machine control prescribes a current hydraulic volume (Q) that is needed according to program to the electric motor as an rpm setpoint (n) and prescribes the current hydraulic pressure (p) that is needed according to the program to the electric motor as a torque setpoint (M), in which the electric setpoint data for the rpm (n) and the torque (M) and respectively for the hydraulic volume flow (Q) and for the hydraulic pressure (p) are stored in a memory, to which the machine control has access, and wherein the current power (P) is determined in the machine control from the setpoint data for the pressure (p) and for the hydraulic volume flow (O) and/or from the rpm (n) and the torque (M) according to the relation $P = p \times O$ and/or $P = n \times M$ and are used as a basis for regulating the electric motor by the machine control.

2. The hydraulic operating system of claim 1, wherein the respective setpoints (M) are prescribed as torque limits which may not be exceeded; by which the respective hydraulic pressure (p) is limited.

3. The hydraulic operating system of claim 1, wherein the power (P) that is needed at any particular time is prescribed as a power limit that may not be exceeded, as a consequence of which the power (P) is limited.

4. The hydraulic operating system of claim 1, wherein the machine control triggers an alarm if the determination of the power (P) results in a value that exceeds a preset maximum.

5. The hydraulic operating system of claim 1, wherein the energy (W) consumed over an operating cycle is determined from the calculated power (P) over the time (t) by way of the relation $W = \int P \, dt$ and is outputted.

6. The hydraulic operating system of claim 1, wherein the hydraulic pump is an internally-geared-wheel pump.

7. The hydraulic operating system of claim 1, wherein the electric motor is a vector-regulated, a three-phase squirrel-cage motor.

8. The hydraulic operating system of claim 1, wherein the electric motor is a frequency-regulated, three-phase squirrel-cage motor.

9. The hydraulic operating system of claim 1, wherein the electric motor is a three-phase servo-motor.

10. The hydraulic operating system of claim 1, wherein the electric motor is actuated by one or more programmable ramp generators which act on the rpm control and/or on the torque control.

11. The hydraulic operating system of claim 1, wherein the hydraulic pump is flanged directly on the electric motor or is connected to it through a pump carrier.

12. The hydraulic operating system of claim 1, wherein the rpm control and/or the torque control of the electric motor is subject to a setpoint/control, which in turn is again influenced by sensors at the hydraulic drives.

13. A hydraulic operating system for a plastic processing machine, comprising
   a hydraulic pump which is a continuous or constant transport pump;
   at least one hydraulic drive;
   a hydraulic line network which connects the hydraulic pump and the hydraulic drives;
   an electric motor which drives the hydraulic pump at a variable speed; and
   a machine control for controlling the speed of and torque generated by the electric motor in response to a current production phase of the plastic processing machine, and for determining the power produced by the motor and using the power to regulate the motor.

14. The hydraulic operating system of claim 13, wherein the machine control limits the torque generated by the motor.

15. The hydraulic operating system of claim 13, wherein the machine control limits the power produced by the motor.

16. The hydraulic operating system of claim 15, wherein the machine control triggers an alarm if the power exceeds a preset maximum.

* * * * *

UNITED STATES PATENT AND TRADEMARK OFFICE
CERTIFICATE OF CORRECTION

PATENT NO. : 5,762,973
DATED : June 9, 1998
INVENTOR(S) : Johann Holzschuh

It is certified that error appears in the above-identified patent and that said Letters Patent is hereby corrected as shown below:

In Claim 1, at column 5, line 3, "(O)" should be -- (Q) --.
In Claim 1, at column 5, line 5, "P=p x O" should be -- P=p x Q --.
In Claim 2, at column 5, line 12, ";" should be -- , --.

Signed and Sealed this

Twenty-fifth Day of August, 1998

Attest:

BRUCE LEHMAN

*Attesting Officer*   *Commissioner of Patents and Trademarks*